(12) United States Patent
Nakagaki

(10) Patent No.: US 6,456,860 B1
(45) Date of Patent: Sep. 24, 2002

(54) BASE STATION EQUIPMENT AND BASE STATION CONTROL EQUIPMENT

(75) Inventor: Tatsuru Nakagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/348,937

(22) Filed: Jul. 7, 1999

(30) Foreign Application Priority Data

Dec. 16, 1998 (JP) .......................................... 10-357902

(51) Int. Cl.[7] .............................. H04B 1/38; H04M 1/00
(52) U.S. Cl. ....................... 455/561; 455/560; 370/905; 370/474; 370/395; 370/902
(58) Field of Search ................ 455/561, 560, 455/450; 370/902, 905, 913, 527, 528, 529, 474, 395

(56) References Cited

U.S. PATENT DOCUMENTS

| | | | | |
|---|---|---|---|---|
| 5,734,979 A | * | 3/1998 | Lu et al. ...................... | 455/428 |
| 5,862,476 A | * | 1/1999 | Hasegawa .................... | 455/422 |
| 5,884,187 A | * | 3/1999 | Ziv et al. ..................... | 455/522 |
| 5,907,555 A | * | 5/1999 | Raith .......................... | 370/468 |
| 5,917,811 A | * | 6/1999 | Weaver, Jr. et al. ......... | 370/332 |
| 5,926,470 A | * | 7/1999 | Tiedemann, Jr. ............ | 370/334 |
| 6,011,971 A | * | 1/2000 | Jolma ......................... | 455/438 |
| 6,119,004 A | * | 9/2000 | Yamada et al. ............. | 455/436 |
| 6,208,699 B1 | * | 3/2001 | Chen et al. .................. | 375/340 |
| 6,222,832 B1 | * | 4/2001 | Proctor ....................... | 370/335 |

* cited by examiner

Primary Examiner—Edward F. Urban
Assistant Examiner—Marceau Milord
(74) Attorney, Agent, or Firm—Katten Muchin Zavis Rosenman

(57) ABSTRACT

A wireless communication system having base station equipment which forms a wireless zone and base station control equipment which performs channel control of calls occurred in the radio stations located in the wireless zone, in cooperation with a switching center. The base station equipment extracts a specific speech signal that has control information included in speech signals generated by a variable rate codec. The base station equipment disassembles the speech signals and the control information into individual transmission units and transmits the transmission units to the radio base station. The base station radio control equipment outputs or accepts control information including identification information, and performs delivery of the control information between the radio station and the switching center.

12 Claims, 10 Drawing Sheets

BASE STATION EQUIPMENT AND BASE STATION CONTROL EQUIPMENT

BACKGROUND OF THE INVENTION

1. Field of the Invention

The present invention relates to a base station equipment for forming wireless zones in a radio communication system, and a base station control equipment which performs, in cooperation with a switching center, channel control of calls that occurred in radio stations located in the wireless zones.

2. Description of the Related Art

A code division multiple access (CDMA) system, which essentially has confidentiality and interference-resistibility, is a multiple access system in which the suppression of cochannel interference and the efficient reuse of radio frequencies are possible.

In addition, such a CDMA system is positively being applied to mobile communication systems recently due to the fact that the establishment of technologies for realizing the transmitting power control with high accuracy and high response has enabled the flexible control of radio transmission characteristics by the sector zone.

FIG. 8 shows an example of configurations for a mobile communication system to which the CDMA system is applied.

In the drawing, a mobile station 73 is located in one of wireless zones 72-1 to 72-m, each of which is individually formed by base stations 71-1 to 71-m. Each of these base stations 71-1 to 71-m is connected to a base station control station 75 via communication links 74-1 to 74-m. The base station control station 75 is connected to a mobile switching center, not shown, through a certain communication links 76-1 to 76-m.

The base station 71-1 comprises an antenna 77-1 and a radio processing part 78-1, a modem part 79-1, an assembly/disassembly part 80-1, and an E1 terminating part 81-1 cascaded between a feeding end of the antenna 77-1 and an end of the communication link 74-1.

Because the configuration of the base stations 71-2 to 71-m is identical to that of the base station 71-1, the same reference numerals, having subindexes "2" to "m", will be assigned to corresponding composing elements hereafter and their explanation and illustration will be omitted.

The base station control station 75 comprises BTS interface parts 82-1 to 82-m individually connected to the other ends of the communication links 74-1 to 74m, voice processing parts 83-1 to 83-n individually connected to the above-mentioned mobile switching center via the communication links 76-1 to 76-n, an ATM switch 84 disposed between the BTS interface parts 82-1 to 82-m and the voice processing parts 83-1 to 83-n, and a signaling processing part 85 connected to a specific port of the ATM switch 84.

The BTS interface part 82-1 comprises an E1 terminating part 86-1 assembly/disassembly part 87-1, and an ATM interface part 88-1, which are cascaded between the other end of the communication link 74-1 and the corresponding port of the ATM switch 84.

Because the configuration of the BTS interface parts 82-2 to 82-m is identical to that of the BTS interface part 82-1, the same reference numerals, having subindexes "2" to "m", will be assigned to corresponding composing elements hereafter and their explanations and illustrations will be omitted.

The voice processing part 83-1 comprises an ATM interface part 89-1, an assembly/disassembly part 90-1, and a speech codec 91-1, which are cascaded between the corresponding port of the ATM switch 84 and one end of the communication link 76-1.

Because the configuration of the voice processing parts 83-2 to 83-n is identical to that of the voice processing part 83-1, the same reference numerals, having subindexes "2" to "n", will be assigned to corresponding composing elements hereafter and their explanations and illustrations will be omitted.

The signaling processing part 85 comprises an ATM interface part 92 cascaded to the corresponding port of the ATM switch 84 and a signaling terminating part 93.

In conventional examples of such configurations, the signaling processing part 85 provided on the base station control station 75 cooperates with the base stations 71-1 to 71-m connected via the switch 84, the BTS interface parts 82-1 to 82-mn and the communication links 74-1 to 74-m, and also cooperates with the above-mentioned mobile switching center so as to perform channel control based on a predetermined procedure.

In the channel controlling process, control information (signaling signal) transmitted by the signaling terminating part 93 (for simplicity, it is assumed that hereafter the control information is what is to be transmitted to the mobile station 73 via the base station 71-1) is fed to the modem part 79-1 via the ATM interface part 92, the ATM switch 84, the ATM interface part 88-1, the assembly/disassembly part 87-1, the E1 terminating part 86-1, the communication link 74-1, the E1 terminating part 81-1 and the assembly/disassembly part 80-1.

Besides, for the completed call occurred in the above-mentioned channel controlling process (for simplicity, it is assumed that the voice processing part 83-1 is assigned to the completed call by the above-mentioned mobile switching center), speech signals are fed from the mobile switching center.

In the voice processing part 83-1, the speech codec 91-1 feeds the speech signals to the BTS interface part 82-1 via the assembly/disassembly part 90-1, the ATM interface part 89-1 and the ATM switch 84.

Here, the assembly/disassembly parts 87-1 to 87-m and 90-1 to 90-n cooperate with the ATM interface parts 88-1 to 88-m and 89-1 to 89-n, under the channel control performed by the signaling processing part 85. The ATM switch 84 forms provided channels (paths) for connecting the BTS interface parts 82-1 to 82-m with the voice processing parts 83-1 to 83-n and the signaling processing part 85 (which adapts flexibly to the change of word length in the above-mentioned control information and the speech signals, and are independent from the characteristics of the control information and the speech signals have as transmission information).

In the base stations 71-1 to 71-m, the E1 terminating parts 81-1 to 81-m adapts to a transmission system applied to the communication links 74-1 to 74-m (for simplicity, it is assumed here to be a physical interface E1 provided by application of an STM system having the transmission rate of 2,048 Mbps) and accept the control information and the speech signals fed from the base station control station 75 via the communication links 74-1 to 74-m in a predetermined format.

The assembly/disassembly parts 80-1 to 80-m transform the control information and the speech signals to packets in a predetermined format receivable by the mobile station 73. The modem parts 79-1 to 79-m generate primary modulated signals by modulating the carrier signals according to the packets.

The radio processing part 78-1 to 78-m generate a transmission signals by performing a spreading process based on the direct sequence to the primary modulated signals respectively, and form the wireless zones 72-1 to 72-m by transmitting the transmission signals through the antennas 77-1 to 77-m.

In connection to this, with regard to the control information and the speech signals received from the mobile station 73 located in the wireless zone 72-1, the composing elements of the base station 71-1 and the base station control station 75 perform, unless otherwise noted, processes which are reversible in relation to the above-mentioned processes. Hence, for simplicity, explanations of these processes are omitted.

The mobile station 73 is equipped with a variable-rate speech codec based on the QCELP method, which outputs the frames shown in FIG. 9($a$) as speech signals every 20 milli-seconds by encoding at a ⅛ rate during, for example, the period on which the above-mentioned completed call occurred and no speech signal is fed by the caller at all.

However, during the period any speech signal is given, the above-mentioned variable-rate speech codec outputs the code words shown in FIGS. 9($b$) to ($d$) as speech signals every 20 milli-seconds, by performing a ¼ to full rate encoding.

When a completed call is generated in the mobile station 73, a traffic channel is assigned to the mobile station 73 based on the above-mentioned channel controlling procedure under the control of the base station control station 75.

Furthermore, the mobile station 73 as described above generates an upward transmission signal by performing a primary modulating process and a direct spreading process on code words provided by the speech codec, as mentioned above, or a frame of a predetermined word length consisting of a plurality of code words disposed with redundancy (hereafter this frame will be referred to as "upward speech frame"), as transmission information. Therefore, the mobile station 73 generates an upward transmission signal which is transmitted to the base station 71-1.

In the base station control station 75, the above-mentioned upward speech frame is provided to the speech codec 91-1 via the base station 71-1, the communication link 74-1, the BTS interface part 82-1, the ATM switch 84, the ATM interface part 89-1 and the assembly/disassembly part 90-1. The speech codec 91-1 accumulates and expands the speech signals given as the code words included in the upward speech frame, then transforms them into a PCM signal with a bit rate of 64 kbps, and feeds the PCM signal to the mobile switching center via the communication link 76-1.

In the mobile station 73, when, during the period a completed call occurs and a conversation-state is being maintained, for example, control information for signifying transmission quality or requesting activation of handover should be transmitted to the base station 71-1, the variable-rate speech codec encodes the speech signals at the rate of which the longest codes that the control information could be included in the upward speech frame can be obtained, among the rates "⅛", "¼", "½" and "1" corresponding to FIGS. 9($a$) to ($d$).

Furthermore, the mobile station 73 generates a frame having the same word length as that of the predetermined ones (hereafter referred to as "upward quasi-speech frame"), as shown in any of FIGS. 10($a$) to ($d$), by packing the code words obtained by the encoding and the above-mentioned control information.

The mobile station 73 also generates upward transmission signals by performing the primary modulating process and the direct spreading process with the upward quasi-speech frame as the transmission information and transmits the upward transmission signals to the base station 71.

In the base station control station 75, the above-mentioned upward quasi-speech frame is provided to the assembly/disassembly part 90-1 via the base station 711, the communication link 74-1, the BTS interface part 82-1, the ATM switch 84 and the ATM interface part 89-1.

The assembly/disassembly part 90-1 discriminates whether or not the frame thus provided is an upward quasi-speech frame based on the difference in the format with the above-mentioned speech frame.

In the case that the result of the discrimination is true, the assembly/disassembly part 90-1 separates the code words and the control information included in the quasi-speech frame, and provides the former to the speech codec 91-1.

As for the latter, however, the assembly/disassembly part 90 assembles it into an ATM cell and, as shown in FIG. 8($a$), provides the ATM cell to the signaling processing part 85 via the ATM interface part 89-1 and the ATM switch 84.

The control information which should be outputted by the signaling terminating part 93 and transmitted to the mobile station 73 in which a completed call has been occurred, is fed, as shown in FIG. 8($b$), to the assembly/disassembly part 90-1 via the ATM interface part 92, the ATM switch 84, and the ATM interface part 89-1.

The assembly/disassembly part 90-1 varied the rate of encoding which is to be performed by the speech codec 91-1 and the code words received from the mobile switching center via the speech codec 91-1 and the corresponding control information, generates a downward quasi-speech frame to, by performing processes, which are reversible in relation to the processes performed for the upward quasi-speech frame as mentioned above.

Moreover, during the period that the signaling processing part 85 provides no control information at all, the assembly/disassembly part 90-1 performs processes, which are reversible in relation to the processes performed for the upward speech frame as mentioned above, to the speech signals fed by the mobile switching center via the speech codec 91-1.

Therefore, the base stations 71-1 to 71-m can form wireless zones 72-1 to 72-m based on the CDMA system under the channel control which the base station control station 75 performs in cooperation with the mobile switching center, and provide communication service to the mobile stations located in the wireless zones 72-1 to 72-m.

In the above-mentioned conventional example, no detailed explanation is given of the procedure of the channel control performed under control of the signaling terminating part 93 and the coordinated operations of the units adapted to the procedure.

However, as for the procedure of the channel control and the coordinated operations, explanations will be omitted in the following since they are not the features of the present invention and can be achieved by applying a variety of prior arts.

In the above-mentioned conventional example, when the voice processing parts 83-1 to 83-n are assigned to some completed call based on the channel controlling procedure performed by the signaling processing part 85, the assembly/disassembly parts 90-1 to 90-n should perform assembly of the downward quasi-speech frame or disassembly of the upward quasi-speech frame, together with the process of discriminating whether or not the information fed via the ATM interface parts 89-1 to 89-n corresponds to the above-mentioned quasi-speech frame.

Furthermore, the traffic passing through the ATM interface parts 89-1 to 89-n increases as the amount of information of the control information extracted from the upward quasi-speech frame and the control information to be built in the downward quasi-speech frame becomes larger.

Therefore, as for the ATM interface parts 89-1 to 89-n and the assembly/disassembly parts 90-1 to 90-n, load and power consumption are excessive and high-speed devices must be applied to ensure the desired response.

Besides, although such power consumption or applying high-speed devices is technically feasible, there is a high possibility of having limitations of mounting and heat design arises. Therefore it has been difficult to realize a configuration wherein a single ATM interface part and an assembly/disassembly part, having numerals "89" and "90" respectively, are shared by a plurality of speech codecs indicated by numeral "91".

Furthermore, the number of the voice processing parts 83-1 to 83-n to be mounted on the base station control station 75, often becomes as large as several thousand, according to the number of the mobile stations to which communication service should be simultaneously provided via the base station control station 75.

Therefore it has been desired to realize an inexpensive, compact, and highly reliable voice processing part from the view point of reducing cost and improving work efficiency, which relates to maintenance and operation.

SUMMARY OF THE INVENTION

It is an object of the present invention to provide a base station equipment and a base station control equipment by which load distribution of processing the control information can be achieved without causing major change to hardware configuration.

It is another object of the present invention to reduce the load of the base station control equipment without degrading reliability, and to achieve efficient utilization of communication links to which a variety of transmission systems are applied, as well as relaxation of limitation related to mounting and heat design, and cost reduction and improving work efficiency related to maintenance and operation.

According to the present invention, the above-mentioned objects are achieved by a base station equipment comprising: speech signal monitoring means for extracting, specific speech signals to which control information of channel control is added among the speech signals generated by a variable rate codec in a radio station at the transmitting end; disassembly processing means for disassembling the speech signals and control information included in specific speech signals extracted by the speech signal monitoring means into individual transmission units including identification information of any one of the radio station at the transmitting end, a completed call that occurred in the radio station, or the channel assigned to the completed call under the channel control; and a means for transmitting the transmission units to the base station control station individually.

In the above-mentioned base station equipment, the control information and the speech signal included in specific speech signals received from a radio station in which a completed call occurred and the conversation-state is maintained, are disassembled into individual transmission units and transmitted to the control station.

Therefore the configuration of the base station control station is simplified compared with those in conventional examples wherein the processes for the control information and the speech signals included in the above mentioned specific speech signals are performed individually by different means.

According to the present invention, the above-mentioned objects are achieved by a base station equipment comprising: control information accumulation means for accumulating control information including identification information of any one of the radio station supposed to be the destination, the completed call occurred in the radio station, or the channel assigned to the completed call under the channel control; rate discrimination means for discriminating whether or not the encoding rate applied to generation of the speech signals, is lower than a predetermined value concerning speech signals which are received from the base station control station and include identification information of any radio station; and assembly means for generating specific speech signals by adding the control information including common identification information, among the control information accumulated by the control information accumulating means to the speech signals providing the result of the discrimination when the result of the discrimination is true; a means for transmitting the generated specific speech signals to the wireless zone.

In the above-mentioned base station equipment, the control information fed by the base station control station based on the channel controlling procedure is accumulated until the encoding rate applied in generating the speech signals fed by the base station control station becomes below a predetermined threshold value and is also transmitted to the radio station located in the wireless zone, as specific speech signals together with the speech signals.

Therefore, as long as the time length for accumulating the control information is shorter than a degree tolerable based on the channel controlling procedure, the channel control will be surely performed by the base station control station without degrading the speech quality.

According to the present invention, the above-mentioned objects are achieved by a base station equipment comprising: monitoring means for monitoring the period during which the control information including the same identification information as the identification information included in individual speech signals which are false according to the result of the discrimination performed by the rate discrimination means is being accumulated in the control information accumulation means, and for specifying the time when the length of the period exceeds a predetermined upper limit; and signaling priority means for transmitting, at the specified time, all or a portion of the control information which has been accumulated in the control information accumulation means and includes the identification information corresponding to the specified time, to the wireless zones.

In the above-mentioned base station equipment, the control information fed by the base station control station, is transmitted to the wireless zones without being accumulated in the control information accumulation means during a period exceeding the above-mentioned upper limit.

Therefore, as long as the upper limit is set to a value conforming to the channel controlling procedure, the channel control is performed with stability and precisely.

The above-mentioned objects are also achieved by the assembly means discarding the speech signals to be built in specific speech signals when specified a time point by the monitoring means.

According to the above-mentioned configuration, because the required load for transmission of the speech signals fed by the switching center is reduced, the channel control is performed with higher priority as long as the degradation of the speech quality due to the discarding the above-mentioned speech signals is within a tolerable range.

Furthermore, the above-mentioned objects are achieved by delivering the control information and the speech signals as packets adapted to the AAL protocol in segments except for the transmission segments leading to both the radio station and the base station control station.

According to the above-mentioned configuration, the standardization of processes with regard to delivery or generation among the composing elements becomes possible because the control information and the speech signals are fed as the above-mentioned packets in a standard form.

The above-mentioned objects are also achieved by forming, between the transmission segments leading to both the radio station and the base station control station, a path of the ATM layer which is an lower layer of the ATM adaptation layer, and interfacing between the ATM adaptation layer and the ATM layer.

Since assembly/disassembly is performed for the ATM cells which adapt flexibly to the change of the word length of the speech signals due to the difference in the characteristics of the control information and the speech signals and the change of the encoding rate applied to the encoding by the variable rate codec, according to the above-mentioned configuration, the packets including the control information and the speech signals are delivered transparently to the base station control equipment.

Furthermore, the above-mentioned objects are achieved by a base station control equipment comprising: channel control means for outputting or accepting, based on a predetermined procedure, control information including the identification information of any one from the radio station wherein a call occurs, the call, or the channel assigned to the call under the channel control; and exchange means for delivering the control information received by the base station equipment and the control information outputted from the channel control means, and delivering the speech signals received by the radio station and the switching center respectively.

According to the above-mentioned base station control equipment, the control information and the speech signals are transmitted to and received by each other by the exchange means simply identifying both and performing the exchange process, because the control information and the speech signals are delivered as individual transmission information or transmission units.

The above-mentioned objects are achieved by internally delivering packets adapted to the AAL protocol including the control information and the speech signals as ATM cells in the above-mentioned base station control equipment.

In the above-mentioned configuration, standardization of processes with regard to delivery or generation among the composing elements becomes possible because the control information and the speech signals are fed as the above-mentioned packets in a standard form.

Further objects and characteristics of the present invention will be clearly described in detail based on the accompanying drawings.

DESCRIPTION OF THE PREFERRED EMBODIMENT

The principle of the base station equipment according to the present invention will be described with reference to FIG. 1.

Figure 1:
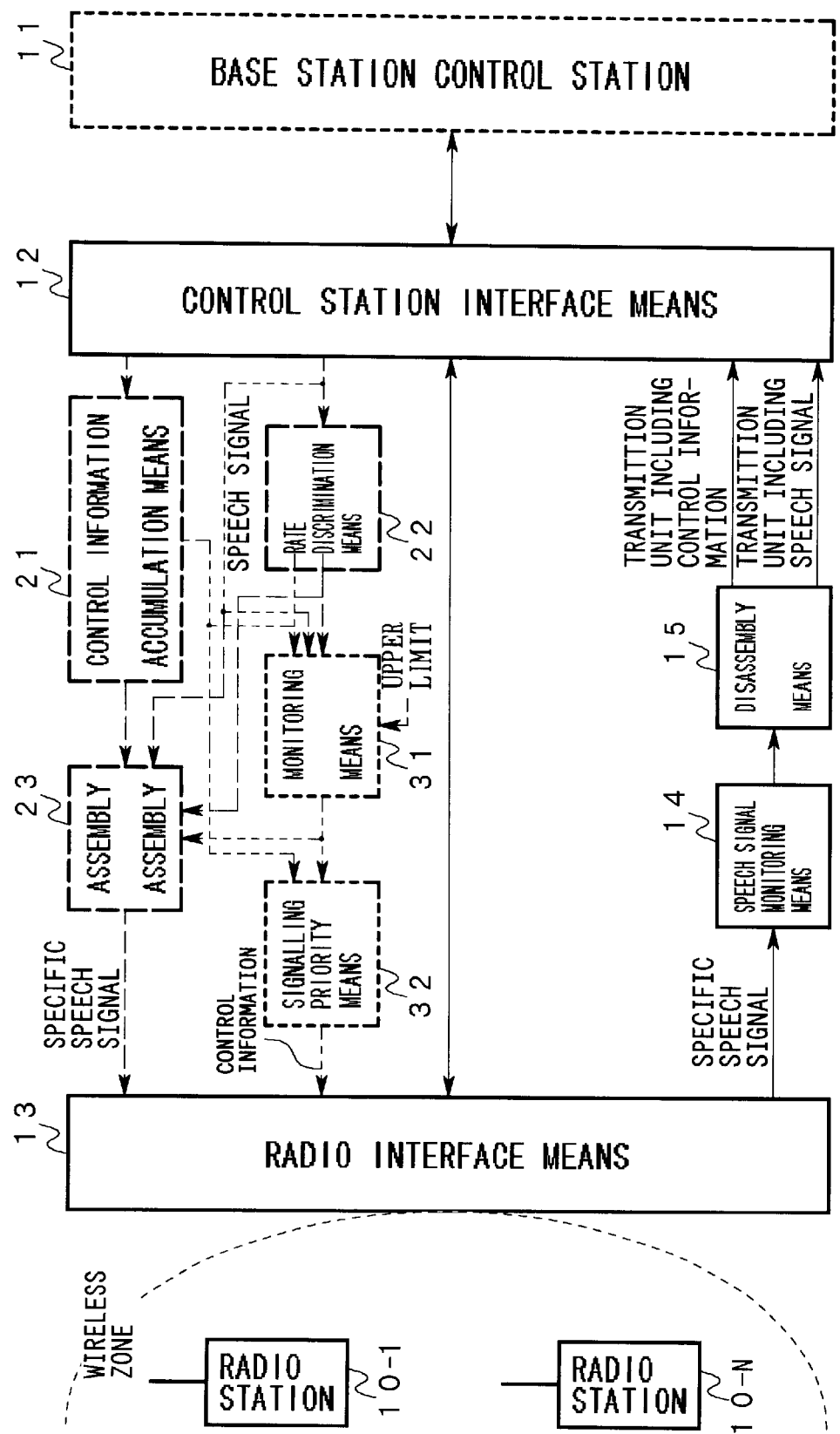
FIG. 1 is a block diagram showing the principle of the base station equipment according to the present invention.

FIG. 1 is a block diagram showing the principle of the base station equipment according to the present invention.

The base station equipment shown in FIG. 1 comprises: control station interface means 12, a radio interface means 13, speech signal monitoring means 14, disassemble processing means 15, control information accumulation means 21, rate discrimination means 22, assembly means 23, monitoring means 31, and signaling priority means 32. The control station interface means 12 is disposed between a base station control station 11 and a wireless zone where the base station control station 11 performs channel control and radio stations 10-1 to 10-N can be located.

The first principle of the base station equipment according to the present invention is as follows.

The control station interface means 12 transmits to or receive from the base station control station 11, which performs the channel control, the control information related to the channel control of the call occured in the radio stations 10-1 to 10-N mounted with a variable rate codec and located in a wireless zone, and the speech signals of the completed call occured under the channel control.

The radio interface means 13 forms a wireless zone, and performs transmission/reception and relay of the control information and the speech signals to be transmitted to or received from the base station control station 11 via the control station interface means 12 between the radio stations 10-1 to 10-N and the control station interface means 12.

The speech signal monitoring means 14 extracts specific speech signals that has control information related to the channel control included in the speech signals generated by the variable rate codec mounted in the radio station being as the transmitting end among the radio stations 10-1 to 10-N. The disassembly processing means 15 disassembles the speech signals and the control information included in the specific speech signals extracted by the speech signal monitoring means 14 into individual transmission units including the identification information of any one of the radio station at the transmitting end, the completed call occured in the radio station, or the channel assigned to the completed call under the channel control. The control station interface means 12 transmits the individual transmission units obtained by the disassembly processing means 15 to the base station control station 11.

The base station equipment having the above configuration operates as follows.

The control station interface means 12 is operated to transmit to or receive from the base station control station 11, which performs the channel control, the control information related to the channel control of the call generated in the radio stations 10-1 to 10-N located in a wireless zone, and the speech signals of the completed call that occured under the channel control. The radio interface means 13 forms the above-mentioned wireless zone, and performs transmission/reception and relay, between the radio stations 10-1 to 10-N and the control station interface means 12, of the control information and the speech signals to be transmitted to or received from the base station control station 11 via the control station interface means 12.

The speech signal monitoring means 14 extracts specific speech signals that has the above-mentioned control information and the speech signals generated by the variable rate codec mounted on the radio station as the transmitting end which is one among the radio stations 10-1 to 10-N. Furthermore, the disassembly processing means 15 disassembles the speech signals and the control information included in the specific speech signals into individual transmission units including the identification information of any one of the above-mentioned radio station as the transmitting end, the completed call occured in the radio station, or the channel assigned to the completed call under the above-mentioned channel control.

The control station interface means 12 transmits the transmission units to the base station control station 11. In other words, as for the specific speech signals received by a radio station in which a completed call occured and the conversation-state is maintained, the control information and the speech signals included in the specific speech signals are disassembled into individual transmission units and transmitted to the control station Therefore the configuration of the base station control station 11 is simplified compared with those in conventional examples wherein the processes for the control information and the speech signals included in the above mentioned specific speech signals are performed individually by different means.

The second principle of the base station equipment according to the present invention will be described in the following with reference to FIG. 1.

The control station interface means 12 transmits to or receives from the base station control station 11 which performs the channel control, the control information related to the channel control of the call that occurred in the radio stations 10-1 to 10-N mounted with a variable rate codec and located in a wireless zone, and the speech signals of the completed call generated under the channel control. The radio interface means 13 forms a wireless zone, and performs transmission/reception and relay, between the radio stations 10-1 to 10-N and the control station interface means 12, of the control information and the speech signals to be transmitted to or received from the base station control station 11 via the control station interface means 12.

The control information accumulation means 21 accumulates the control information which is received from the base station control station 11 by the control station interface means 12 and includes the identification information of any one of the radio station to be the destination among the radio stations 10-1 to 10-N, the completed call occured in the radio station, or the channel assigned to the completed call under the channel control.

The rate discrimination means 22 discriminates whether or not the encoding rate applied to a generation of the speech signals, which are received from the base station control station 11 by the control station interface means 12 and include the any of identification information, is lower than a predetermined threshold value.

When the result of the discrimination performed by the rate discrimination means 22 is true, the assembly means 23 generates specific speech signals by adding the control information including common identification information, among the control information accumulated in the control information accumulating means 21, to the speech signals which are received by the control station interface means 12 and provide the result of the discrimination.

The radio interface means 13 transmits the specific speech signals generated by the assembly means 23 to the wireless zone.

The base station equipment having the above configuration operates as follows.

The control station interface means 12 transmits to or receives from the base station control station 11, which performs the channel control, the control information related to the channel control of the call occured in the radio stations 10-1 to 10-N located in a wireless zone, and the speech signals of the completed call occured under the channel control.

The radio interface means 13 forms the above-mentioned wireless zone, and performs transmission/reception and relay, between the radio stations 10-1 to 10-N and the control station interface means 12, of the control information and the speech signals to be transmitted to or received from the base station control station 11 via the control station interface means 12.

The control information accumulation means 21 is received as mentioned above, and accumulates the control information which includes an identification information of the radio station to be the destination among the radio stations 10-1 to 10-N, the completed call occured in the radio station, or the channel assigned to the completed call under the above-mentioned channel control. Furthermore, the rate discrimination means 22 discriminates whether or not the encoding rate applied to generation of the speech signals, which are received from the base station control station 11 via the control station interface means 12 and include identification information of any one mentioned above, is lower than a predetermined threshold value.

When the result of the discrimination is true, the assembly means 23 generates specific speech signals by adding the control information including common identification information, among the control information accumulated in the control information accumulating means 21, to the speech signals which are received via the control station interface means 12 and provide the result of the discrimination. Furthermore, the radio interface means 13 transmits the specific speech signals to the wireless zone.

Therefore, the control information fed by the base station control station 11 based on the channel control procedure is accumulated until the encoding rate applied when generating the speech signals fed by the base station control station 11 becomes below a predetermined value and is also transmitted to the radio station located in the wireless zone, as specific speech signals together with the speech signals.

Therefore as long as the time length for accumulating the control information is shorter than a degree tolerable based on the channel controlling procedure, channel control will be surely performed by the base station control station 11 without degrading the speech quality.

The third principle of the base station equipment according to the present invention will be described in the following with reference to FIG. 1.

The monitoring means 31 monitors the period during which the control information including the same identification information as the identification information included in individual speech signals which are false according to the result of the discrimination performed by the rate discrimination means 22 is being accumulated in the control information accumulation means 21, and specifies the time when the length of the period exceeds a predetermined upper limit.

The signaling priority means 32 transmits, at the time point specified by the monitoring means 31, all or a portion of the control information including the identification information corresponding to the specified time point, among the identification information which has been accumulated in the control information accumulation means 21, to the wireless zones via the radio interface means 13.

The base station equipment having the above configuration operates as follows.

The monitoring means 31 monitors the period during which the control information including the same identification information as the identification information included in individual speech signals which are false according to the result of the discrimination performed by the rate discrimination means 22 is being accumulated in the control information accumulation means, and specifies the time point when the length of the period exceeds a predetermined upper limit.

The signaling priority means 32 transmits, at the time point specified as described above, all or a portion of the control information which has been accumulated in the control information accumulation means 21 and includes the identification information corresponding to the specified time point, to the wireless zones via the radio interface means 13.

Therefore, the control information fed by the base station control station 11, based on the channel controlling procedure, is transmitted to the wireless zones without being accumulated in the control information accumulation means 21 during a period exceeding the above-mentioned upper limit.

Therefore, as long as the above-mentioned upper limit is set to a value conforming to the channel controlling procedure, the channel control is performed with stability and precisely.

The fourth principle of the base station equipment according to the present invention will be described in the following with reference to FIG. 1.

The assembly means 23 discards the speech signals to be built in specific speech signals when specified a certain time point by the monitoring means 31.

With the above-mentioned configuration, because the required load of the radio interface means 13 for transmission of the speech signals fed by the switching center is reduced, the channel control is performed preferentially as long as the degradation of the speech quality due to the discarding of the above-mentioned speech signals is within a tolerable range.

The fifth principle of the base station equipment according to the present invention will be described in the following in reference to FIG. 1.

The control information and the speech signals are delivered as packets adapted to the AAL protocol in segments except for the radio transmission segment between the radio interface means 13 and the radio stations 10-1 to 10-N, and the transmission segment between the control station interface means 12 and the base station control station 11.

With the base station equipment having the above-mentioned configuration, it is possible to achieve the standardization of processes with regard to delivery or generation of the control information and the speech signals between the radio interface means 13 and the radio stations 10-1 to 10-N and between the control station interface means 12 and the base station control station 11 because the control information and the speech signals are fed as the above-mentioned packets in a standard form.

Furthermore, the above-mentioned standardization is also achieved in the case when in the base station control station 11, the communication link formed leading to the base station control station 11 is transparent. As for the process to be performed in the base station control station 11 in order to convert the format of the above-mentioned control information and speech signals, the load on the base station equipment according to the present invention can be distributed.

The sixth principle of the base station equipment according to the present invention will be described in the following with reference to FIG. 1.

A path of the ATM layer which is an lower layer of the ATM adaptation layer is formed between the control station interface means 12 and the base station control station 11. The control station interface means 12 interfaces between the ATM adaptation layer and the ATM layer.

In the base station equipment having the above-mentioned configuration, the packets including the control information and the speech signals are delivered transparently to and from the base station control equipment 11, by performing assembly/disassembly of the ATM cells which adapt flexibly to the change of the word length of the speech signals due to the change of the encoding rate applied to the encoding by the variable rate codec and to the difference in the characteristics of the control information and the speech signals.

The principle of the base station control equipment according to the present invention will be described in the following in reference to FIG. 2.

Figure 2:
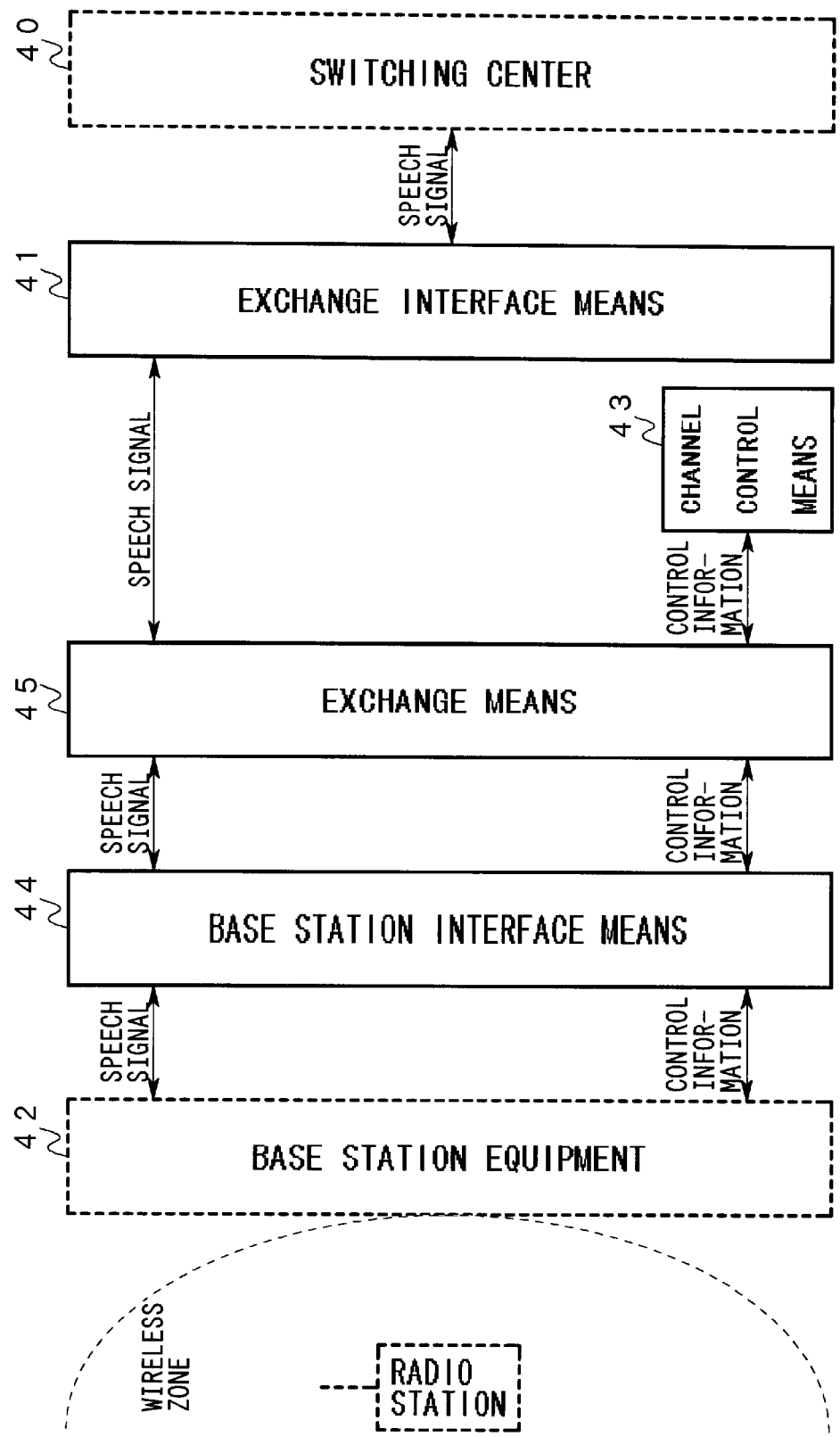
FIG. 2 is a block diagram showing the principle of the base station control equipment according to the present invention.

FIG. 2 is a block diagram showing the principle of the base station control equipment according to the present invention.

The base station control equipment shown in FIG. 2 comprises an exchange interface means 41, a channel control means 43, a base station interface means 44, and an exchange means 45 disposed between the switching center 40 and the base station equipment 42.

The first principle of the base station control equipment according to the present invention is as follows.

The exchange interface means 41 interfaces with the switching center 40 with regard to transmission and reception of the speech signals, the speech signals being a series of datagrams. The channel control means 43 performs the channel control of the wireless zone formed by the base station equipment 42 shown in FIG. 1, and outputs or accepts, based on a predetermined procedure, the control information including the identification information of any one of the radio station located in the wireless zone wherein a call occurred, the call, or the channel assigned to the call under the channel control, the control information being a series of datagrams. The base station interface means 44 interfaces with the base station equipment 42 with regard to transmission and reception of the control information and the speech signals.

The exchange means 45 performs delivery of the control information received via the base station interface means 44 and the control information outputted by the channel control means 43, respectively, the delivery being done per datagram between the channel control means 43 and the base station interface means 44, and performs delivery of the speech signals received via the base station interface part means 44 and the exchange interface means 41, respectively, the delivery being done per datagram between the exchange interface means 41 and the base station interface means 44. base station interface part means 44 and the exchange interface means 41, respectively, between the exchange interface means 41 and the base station interface means 44.

The base station control equipment having the above configuration operates as follows.

The exchange interface means 41 interface with the switching center 40 with regard to transmission and reception of the speech signals, the speech signals being a series of datagrams, and the base station interface means 44 interfaces with the base station equipment 42 with regard to transmission and reception of the control information and the speech signals.

The channel control means 43 performs channel control of the wireless zone formed by the base station equipment 42 shown in FIG. 1, and outputs or accepts , based on a predetermined procedure, the control information including the identification information of any one from the radio station located in the wireless zone wherein a call occurred, the call, or the channel assigned to the call under the channel control, the control information being a series of datagrams.

Also the exchange means 45 performs delivery of the control information received via the base station interface means 44 and the control information outputted by the channel control means 43, respectively, the delivery being done per datagram between the channel control means 43 and the base station interface means 44, and performs delivery of the speech signals received by via the base station interface means 44 and the exchange interface means 41 respectively, the delivery being done per datagram between the exchange interface means 41 and the base station interface means 44.

Therefore, since the control information and the speech signals are delivered as individual transmission information or transmission units between the base station equipment 42 and the base station interface means 44, the control information and the speech signals are transmitted to and received from each other between the base station equipment 42 and the channel control means 43 and between the base station equipment 42 and the switching center 40, respectively, by the exchange means 45 simply identifying both and performing exchange process.

The second principle of the base station control equipment according to the present invention will be described in the following with reference to FIG. 2.

Packets adapted to the AAL protocol in segments with the control information and the speech signals are delivered as ATM cells except for the transmission segment between the base station interface means 44 and the radio station equipment 42, and between the exchange interface means 41 and the switching center 40.

In the base station control equipment having the above-mentioned configuration, standardization of processes with regard to delivery or generation between the base station interface means 44 and the base station equipment 42, and between the exchange interface means 41 and the switching center 40 becomes possible because the control information and the speech signals are fed as the above-mentioned packets in a standard form.

The embodiments of the base station equipment and the base station control equipment according to the present invention will be described in the following with reference to FIGS. 3 to 7.

Figure 3:
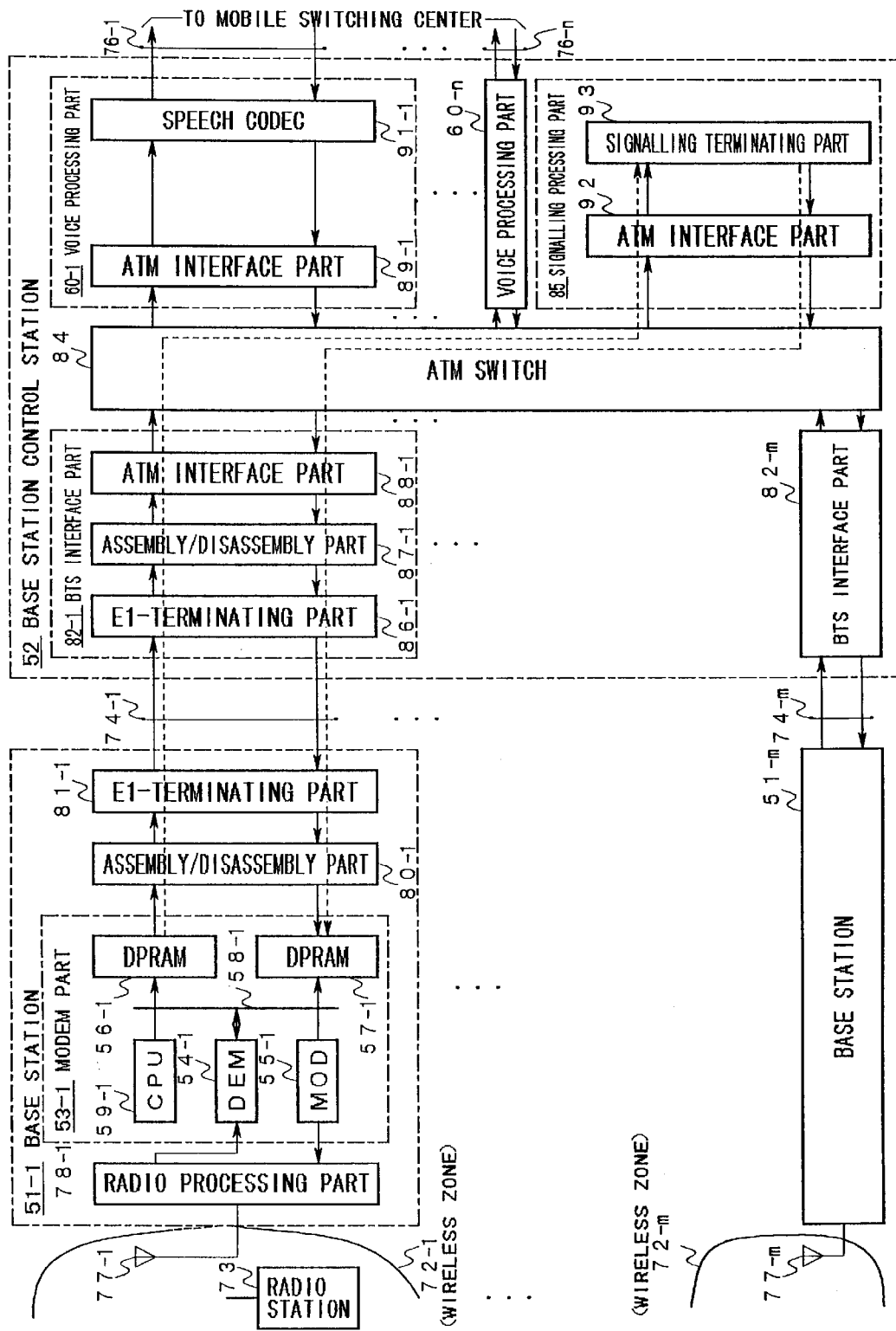
FIG. 3 is a block diagram showing the first embodiment of the base station and the base station control station according to the present invention.

FIG. 3 is a block diagram showing the first embodiment of the base station and the base station control station according to the present invention.

Figure 8:
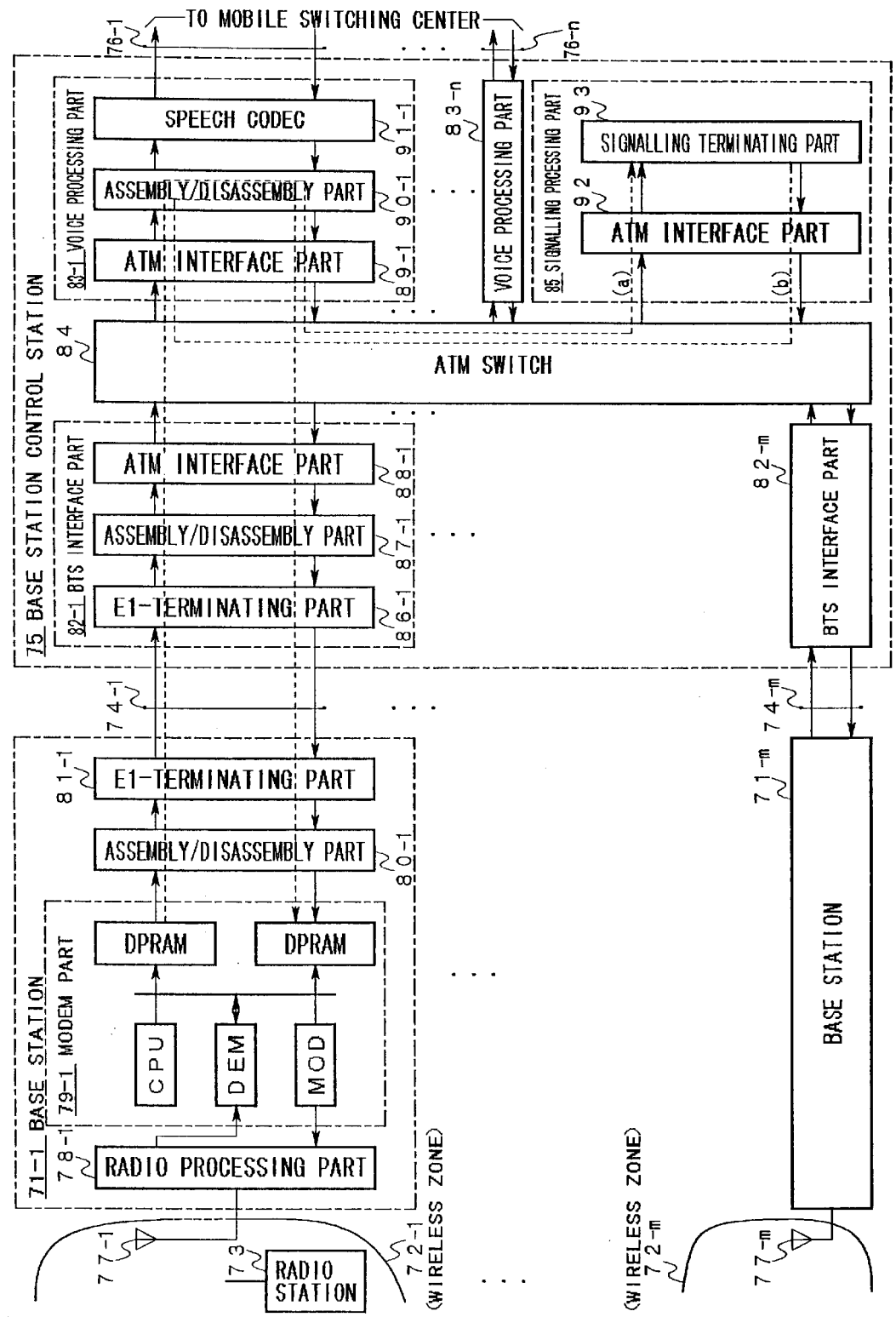
FIG. 8 is a block diagram showing an exemplary configuration of a mobile communication system applying the CDMA system.

In the drawing, the same reference numerals will be assigned to composing elements having a function or configuration identical to those shown in FIG. 8, and their explanation will be omitted.

The difference between the configuration of the present embodiment and conventional examples shown in FIG. 8 can be found in the constructions of the base stations 51-1 to 51-m included in place of the base stations 71-1 to 71-m, and the base station control station 52 in place of the base station control station 75.

The difference between the configurations of the base stations 51-1 to 51-m and the base stations 71-1 to 71-m lies in that the modem parts 53-1 to 53-m are equipped, respectively, in place of the modem parts 79-1 to 79-m.

The modem part 53-1 comprises a demodulation part (DEM) 54-1 and a modulation part(MOD) 55-1 connected to the inputs and the outputs of a radio processing part 75-1, respectively; dual port RAMs (DPRAM) 56-1 and 57-1, one port of which is connected to the disassembly input and the assembly output of the assembly/disassembly part 80-1, respectively; a bus 58-1 connected to bus terminals of the demodulation part 54-1 and the modulation part 55-1 and to the other ports of the dual port RAMs 56-1 and 57-1; and a processor 59-1 connected to the bus 58-1.

Here, because the configuration of the modem parts 53-2 to 53-m is identical to that of the modem part 53-1, the same reference numerals, having subindexes "2" to "m", will be assigned to corresponding composing elements hereafter and their explanations and illustrations will be omitted.

The difference between the configurations of the base station control station 52 and the base station control station 75 lies in that voice processing parts 60-1 to 60-n are equipped in place of the voice processing parts 83-1 to 83-n.

The difference between the configurations of the voice processing part 60-1 and the voice processing part 83-1 lies in that the ATM interface part 89-1 is directly connected to the speech codec 91-1, and the assembly/disassembly part 90-1 is not equipped.

Here, because the configuration of the voice processing parts 60-1 to 60-n is identical to that of the voice processing part 60-1, the same reference numerals, having subindexes "2" to "n", will be assigned to corresponding composing elements hereafter and their explanation and illustration will be omitted.

The correspondence between the present embodiment with the block diagrams shown in FIGS. 1 and 2 is as follows: The mobile station 23 corresponds to the radio stations 10-1 to 10-N, the base station control station 52 corresponds to the base station control station 11, the assembly/disassembly parts 80-1- to 80-m and the E1 terminating parts 81-1 to 81-m correspond to the control station interface means 12, the radio processing parts 78-1 to 78-m and the antenna 77-1 to 77-m correspond to the radio interface means 13, the demodulation parts 54-1 to 54-m and the processors 59-1 to 59-m correspond to the speech signal monitoring means 14, the processors 59-1 to 59-m and the dual port RAMs 56-1 to 56-m correspond to the disassembly processing means 15, the dual port RAMs 57-1 to 57-m and the processors 59-1 to 59-m correspond to the control information accumulation means 21 and the rate discrimination means 22, the processors 59-1 to 59-m and the modulation parts 55-1 to 55-m correspond to the assembly means 23, the processors 59-1 to 59-m correspond to the monitoring means 31 and the signaling priority means 32, the mobile switching center(not shown) corresponds to the switching center 40, the speech codec 91-1 to 91-N correspond to the exchange interface means 41, the base stations 51-1 to 51-m correspond to the base station equipment 42, the signaling terminating part 93 corresponds to the channel control means 43, the E1 terminating parts 86-1 to 86-m and the assembly/disassembly parts 87-1 to 87-m correspond to the base station interface means 44, and the ATM interface parts 88-1 to 88-m, 89-1 to 89-N, and 92, and the ATM switch 84 correspond to the exchange means 45.

Figure 4:
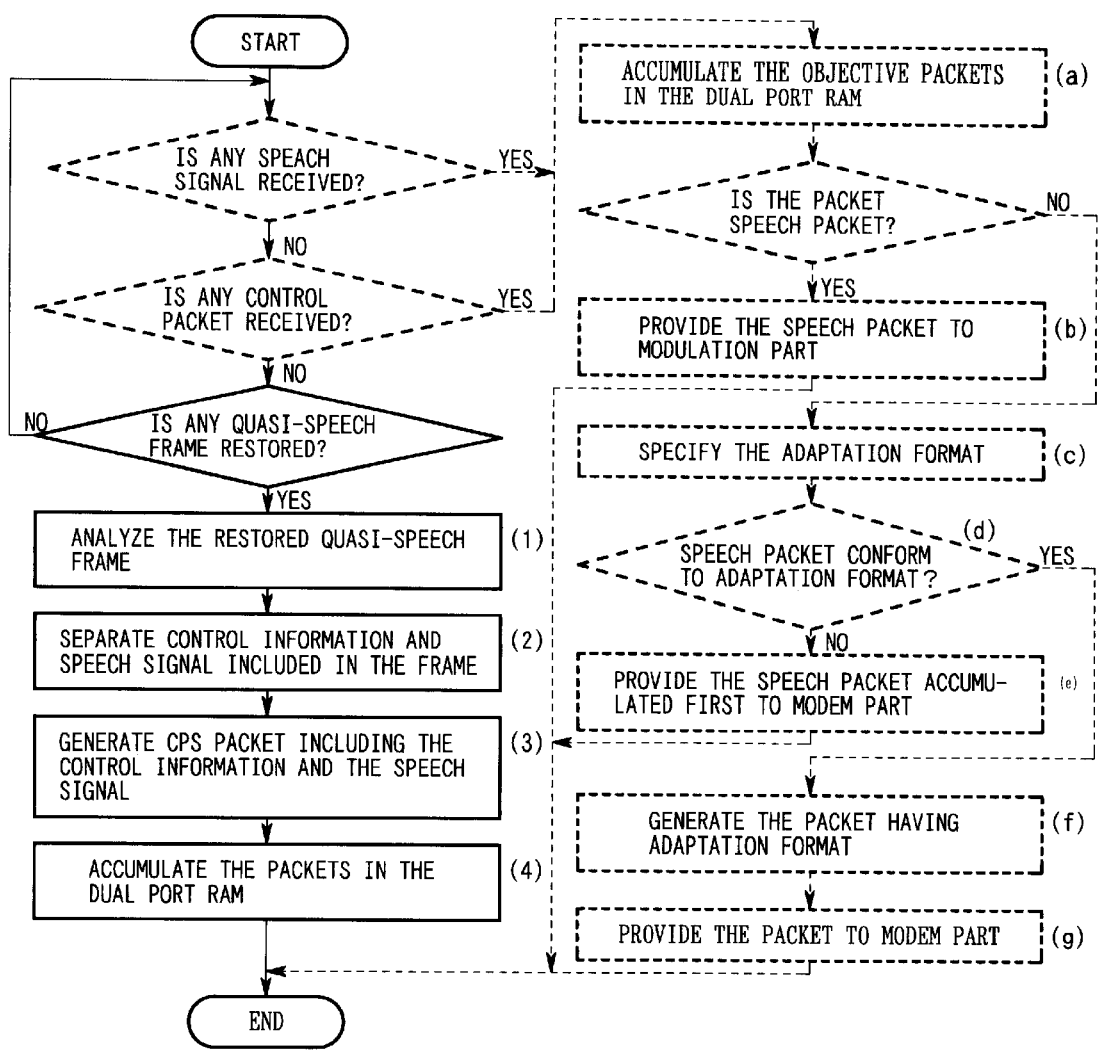
FIG. 4 is a flow chart explaining the operation of the base station in the first and the second embodiments.

FIG. 4 is a flow chart explaining the operation of the base station in the first and the second embodiments.

The operation of the present embodiment will be described in the following with reference to FIGS. 3 and 4.

Concerning the coordinated operations of each unit in the process (wherein the. control information (signaling information) is transmitted or received based on the channel controlling procedure prior to the time when a certain call occured in a mobile station located in the wireless zones 72-1 to 72-m and the call becomes a completed call), because of their identity to that of conventional examples, their explanation will be omitted here.

In the base station control station 52, the ATM interface parts 88-1 to 88-m, 89-1 to 89-m, and 92 interface with the ATM switch similarly as in conventional examples.

Furthermore, the ATM switch 84 forms paths which do not depend on any characteristics of the speech packets or the control packets, respectively, indicating the above-mentioned speech signals or control information and can transmit ATM cells composed by assembling the packets (adapting to the AAL type 2 protocol), between the BTS interface parts 82-1 to 82-m, and the voice processing parts 60-1 to 60-n and the signaling processing part 85,under the channel control performed by the signaling processing part 85.

Figure 5:
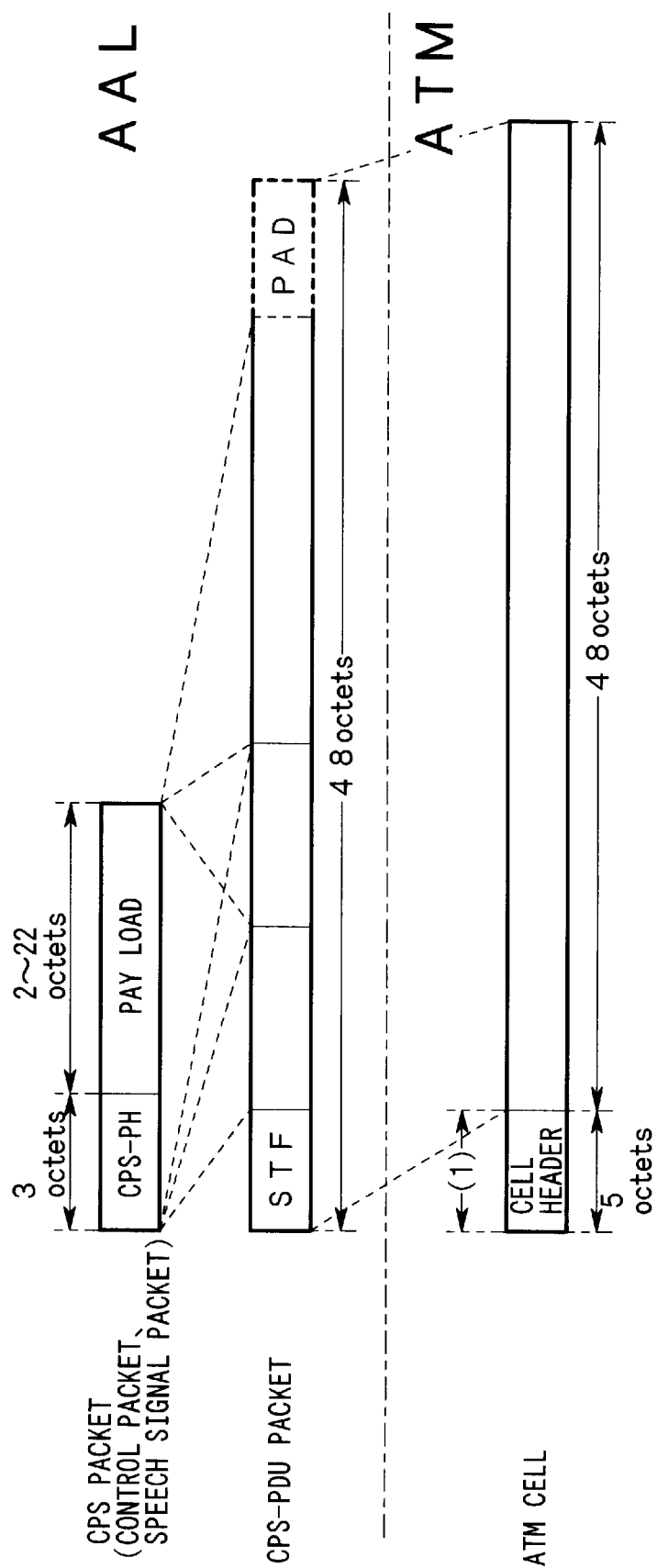
FIG. 5 is a diagram showing a procedure of assembly/disassembly process.

Here, the paths are formed between the ports indicated by VPI/VCI included in the header (FIG. 5(1)) of the ATM cells, provided via the ATM interface parts 88-1 to 88-m, 89-1 to 89-N, and 92, among those of the ATM switch 84.

Figure 9:
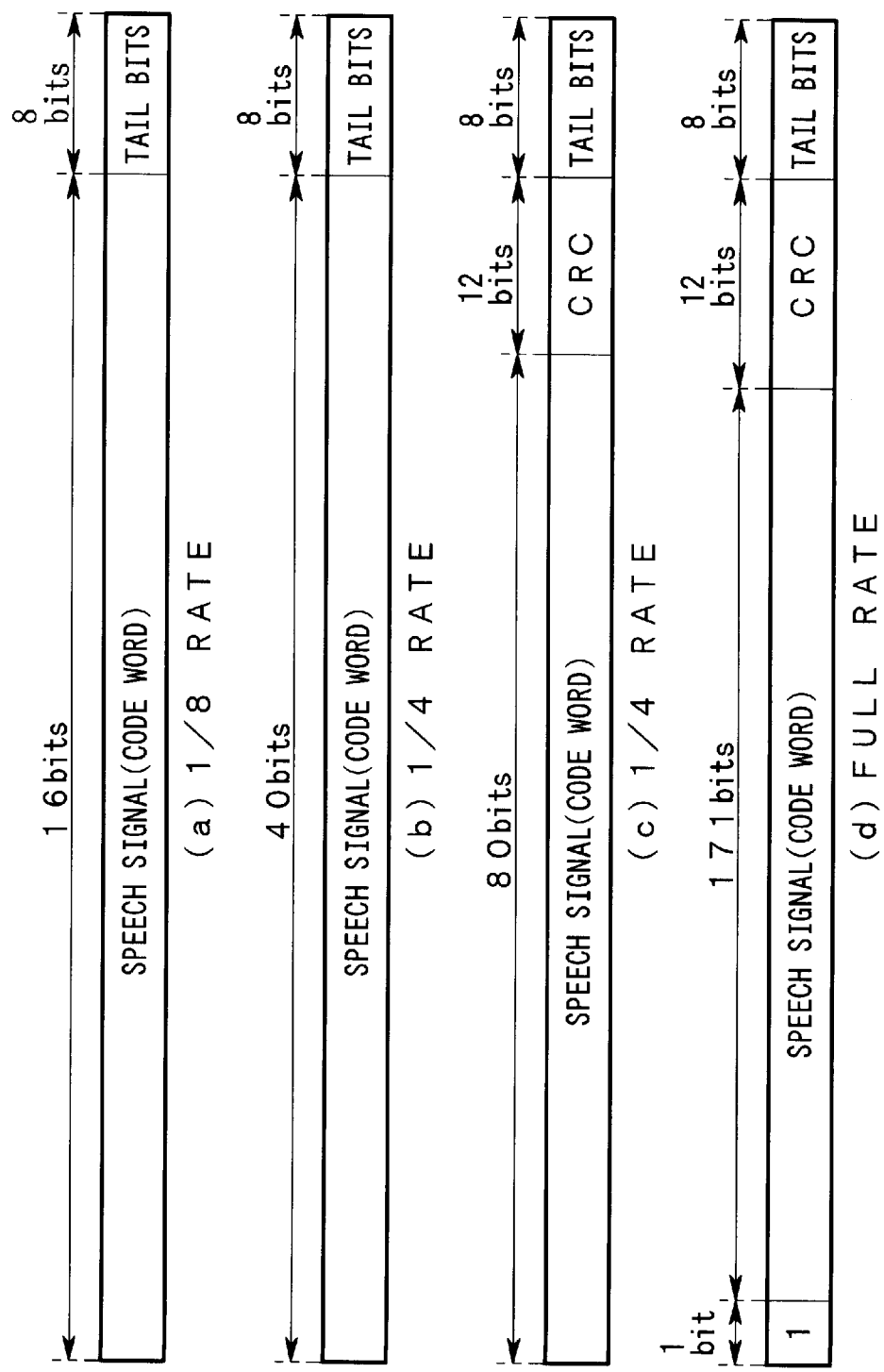
FIG. 9 is a diagram showing the formation of speech signals corresponding to encoding rates.

In the mobile station 73, when, during the period a conversation-state is being maintained, for example, control information for signifying transmission quality or requesting activation of handover should be transmitted to the base station 51-1, the variable-rate speech codec encodes the speech signals at the rate of which the longest codes that the control information could be included in the upward speech frame can be obtained, among the rates "⅛", "¼", "½" and "1" corresponding to FIGS. 9(*a*) to (*d*).

Figure 10:
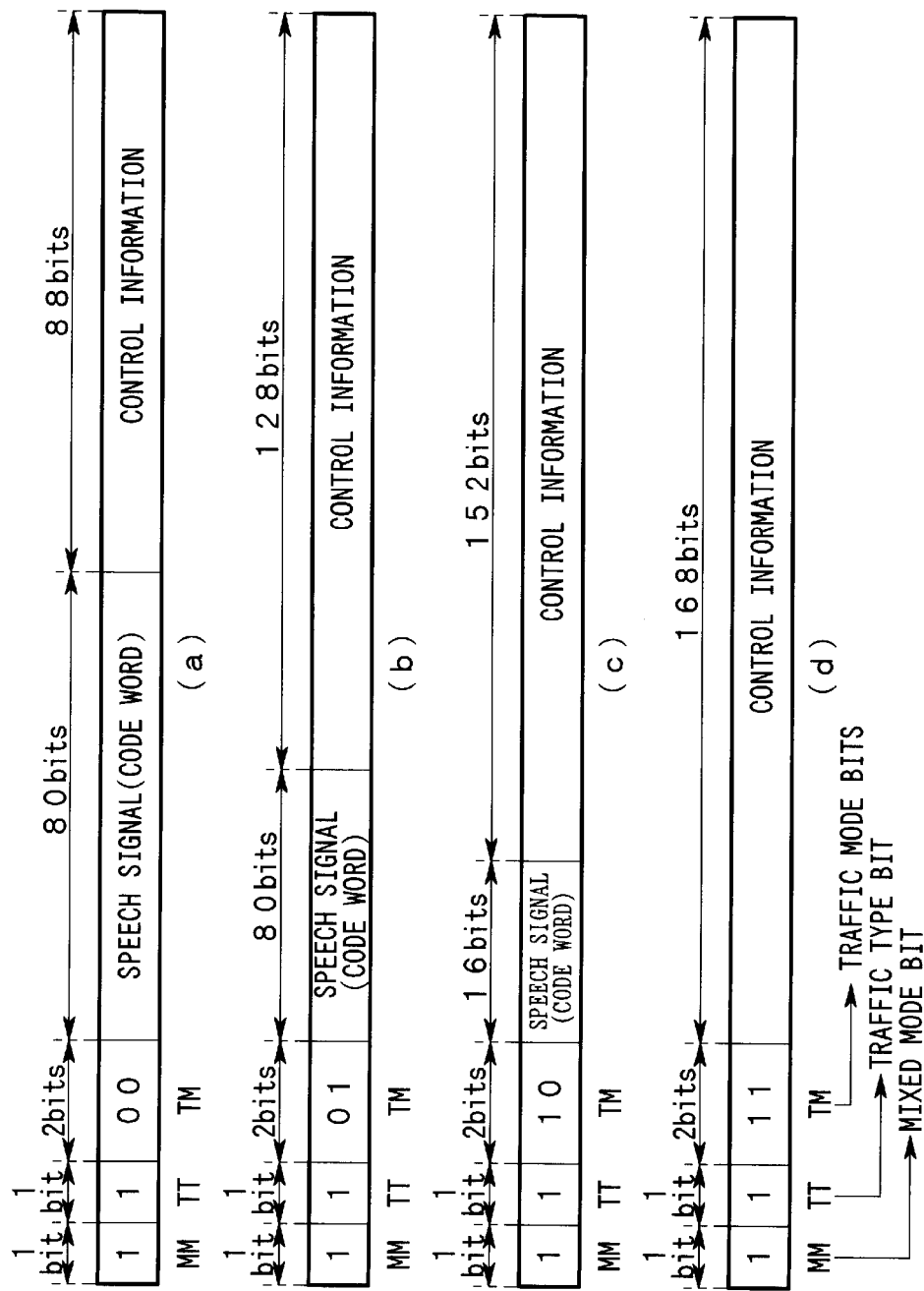
FIG. 10 is a diagram showing the formation of quasi-speech frames.

Furthermore, the mobile station 73 generates an upward quasi-speech frame having the same word length as that of the predetermined ones, as shown in any of FIGS. 10(*a*) to (*d*), by packing the code words obtained by the encoding and the above-mentioned control information. The mobile station 73 also generates upward transmission signals by performing the primary modulating process and the direct spreading process with the upward quasi-speech frame as the transmission information, and transmits the upward transmission signals to the base station 51-1.

In the base station 51-1 the radioprocessing part 78-1 generates a primary modulated signals by performing despreading process to the transmission signals which reached to the antenna 77-1.

In the modem part 53-1, the demodulation part 54-1 restores the above-mentioned quasi-speech frame by demodulating the primary modulated signals.

By identifying and analyzing (FIG. 4(1)) the so restored quasi-speech frame based on the format which the quasi-speech frame can take, the processor 59-1 separates (FIG. 4(2)) the control information and the speech signals included in the quasi-speech frame, generates (FIG. 4(3)), as shown in FIG. 5, a CPS packet wherein the control information and the speech signals are disposed in the payload (hereafter referred to as "control packet" and "speech packet", respectively), and accumulates the packets in the dual port RAM 56-1 (FIG. 4(4)).

Furthermore, the control packet and the speech packet are transmitted to the communication link 74-1 via the assembly/disassembly part 80-1 and the E1 terminating-part 81, and fed to the assembly/disassembly part 87-1 via the E1 terminating part 86, in the base station control station 52.

The assembly/disassembly part 87-1 identifies the control packet and the speech packet based on their format or contents and the predetermined format.

The assembly/disassembly part 87-1 also converts the so identified control packet, as shown in FIG. 5, into a 48-octets CPS-PDU packet, with. a desired number packed into a payload, and a start field STF added to the head (here, a padding is disposed at the tail of the payload, upon necessity).

The assembly/disassembly part 87-1 also converts the similarly identified speech packet, as shown in FIG. 5, into a 48-octets CPS-PDU packet, wherein one or more speech signals having the same destination as that of the above-mentioned CPS-PDU packet is/are packed into a payload, and a start field STF is added to the head (here, a padding is disposed at the tail of the payload, upon necessity).

Furthermore, the assembly/disassembly part 87-1 disposes the entire contents of the CPS-PDU packet in the payload, and assembles the CPS-PDU into an ATM cell which includes the VPI/VCI indicating the port connected to the voice processing part to be the destination under the channel control (for simplicity, assumed to be indicated by the numeral "60-1" though it may be indicated by any one of the numerals "60-1" to "60-n") among the ports of the ATM switch 84, as the cell header, as shown in FIG. 5(1).

The ATM interface part 89-1 included in the voice processing part 60-1 and the ATM interface part 92 included in the signaling processing part 85 perform processes reversible in relation to the processes performed as mentioned above by the assembly/disassembly part 87-1 and the ATM interface part 88-1.

Therefore, because the speech packet, although including code words with a variable word length generated in the encoding process performed by the variable rate codec included in the mobile station 73 and the speech codecs 91-1 to 91-n included in the voice processing parts 60-1 to 60-n, is assembled into the above-mentioned ATM cell, ensuring flexible response to the change of word length of the code words and flexible adaptability to the above-mentioned speech signals having differences in characteristics.

Therefore, the control packet and the speech packet are provided, respectively, to the signaling processing part 85 and the voice processing part 60, via the path formed as mentioned above in the ATM switch 84.

In the voice processing part 60, because no information corresponding to the control information is included in the ATM cell rows so fed via the ATM switch 84, the ATM interface part 89-1 assembles the ATM cell rows into a speech packet, and provides the speech packet directly to the mobile switching center via the speech codec 91-1.

Thus, according to the present embodiment, although he configuration of the modem parts 53-1 to 53-m equipped in the base stations 51-1 to 51-m, and the path formed in the ATM switch 84 under the initiative of the signaling processing part 85 differ from conventional examples, providing the control information to the signaling processing part 85 via the voice processing parts 60-1 to 60-n can be avoided without any major changes of the basic hardware configuration of the base stations 51-1 to 51-m and the base station control station 52.

Therefore, with regard to the voice processing parts 60-1 to 60-n, load and power consumption can be both reduced, and increasing the number of subscribers, to whom simultaneous telecommunication service can be provided via the base station control station 52, becomes possible, as well as allowing a configuration using slow-speed devices and relaxing the limitation concerning mounting and heat design.

The operation of the second embodiment according to the present invention will be described in the following with reference to FIGS. 3 to 5.

First, the ATM switch 84 cooperates with the ATM interface parts 88-1 to 88-m, 89-1 to 89-m, and 92 under initiative of the signaling processing part 85, similarly as in the above-mentioned first embodiment.

Therefore, in the ATM switch 84, a path interconnecting the ATM interface parts 88-1 to 88-m (the BTS interface parts 82-1 to 82-m) and the ATM interface part 92 (the signaling processing part 85) is formed with regard to the ATM cell indicating the control packet, and a path interconnecting the ATM interface parts 88-1 to 88-m (the BTS interface parts 82-1 to 82-m) and the ATM interface parts 89-1 to 89-n (the voice processing part 60-1 to 60-n) is formed with regard to the ATM cell indicating the speech packet.

During the period in which a completed call occurred in the mobile station 73 located in the wireless zone 72-1 and a conversation-state is being maintained, for example, speech signals are fed from the mobile switching center to the voice processing part 60-1 assigned based on the channel controlling procedure.

Since the speech signals are fed as 64 kbps PCM signals via the communication link 76-1, the speech codec 91-1 equipped in the voice processing part 60-1 performs a decoding process adapted to the QCELP method on the speech signals, converts the speech signals into a speech packet in a predetermined format, and provides the speech packet to the ATM interface part 89-1.

For simplicity, the above-mentioned speech packet is assumed to have the same format as with the speech signals generated by the modem part 53-1 in the above-mentioned first embodiment, and to include the identification information of the corresponding completed call or the mobile station in which the completed call occured.

The ATM interface part 89-1 assembles, as shown in FIG. 5, the speech packet into a predetermined cell, and outputs the cell to the corresponding port of the ATM switch 84.

In the signaling processing part 85, on the other hand, the signaling terminating part 93 outputs the control information packet including the control information to be transmitted to the mobile station 73 in which the above-mentioned completed call occurred, based on a predetermined channel controlling procedure.

Here, for simplicity, the format of the above-mentioned control information packet is assumed to be identical to that of the control information packet generated by the modem part 53-1 in the above-mentioned first embodiment, and to include the identification information of the mobile station to be the destination or the corresponding call.

The ATM interface part 92 assembles, as shown in FIG. 5, the control packet into a predetermined cell, and outputs the cell to the corresponding port of the ATM switch 84.

Here, since the above-mentioned procedure of the process by which the cells are assembled by the ATM interface part 89-1, 92 is identical to the procedure of the process performed in the above-mentioned first embodiment under the cooperation of the assembly/disassembly part 87-1 and the ATM interface part 88-1, their explanations will be omitted.

These cells (including the speech packet or the control packet) will be provided to the BTS interface part 82-1, for example, via a path formed, as mentioned above, in the ATM switch 84.

In the BTS interface part 82-1 the assembly/disassembly part 87-1 converts, by disassembling, the above-mentioned cells provided via the ATM interface part 88-1 into a speech packet or a control packet, and provides the speech packet and the control packet to the base station 51-1 via the E1 terminating part 86-1 and the communication link 74-1.

Furthermore, in the base station 51-1, the speech packet and the control packet are provided to the modem part 53-1 via the E1 terminating part 81-1 and the assembly/disassembly part 80-1.

Figure 6:
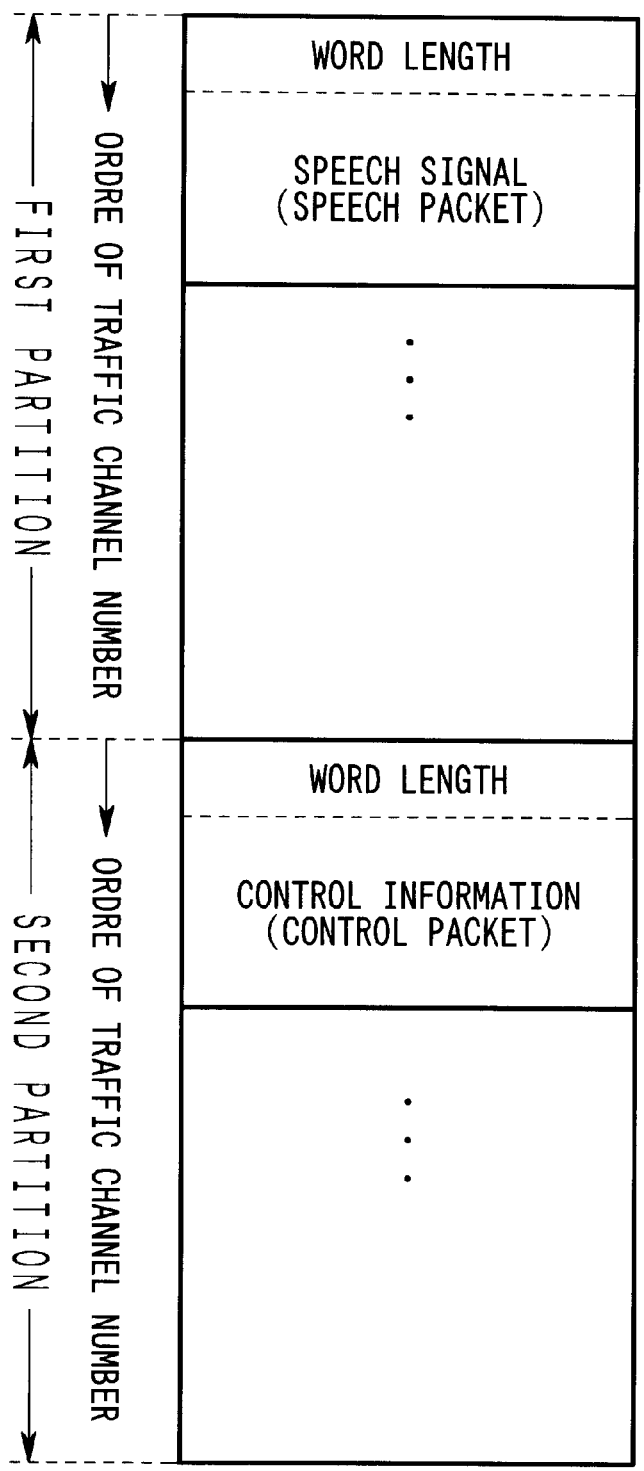
FIG. 6 is a diagram showing an allocation of memory area of a dual port RAM.

In the memory area of the dual port RAM 57-1 included in the modem part 53-1, the first partition to be used for accumulating the speech signals (speech packet), and the second partition to be used for accumulating the control information (control packet), both of which corresponding to individual traffic channels are formed, as shown in FIG. 6.

Besides, the processor 59-1 performs storage management of the partitions.

Furthermore, the speech packet and the control packet provided via the assembly/disassembly part 80-1 are accumulated (FIG. 4(*a*)) in the above-mentioned first. partition and the second partition under such storage management, respectively, and the speech packet is sequentially provided to the modulation part 55-1 in synchronization with the radio channel assigned to the completed call under initiative of the processor 59-1 (FIG. 4(*b*)). Hence, the speech packet is converted into a transmission signal by the modulation part 55-1 and the radio processing part 78-1, and transmitted to the mobile station 73 via the antenna 77-1.

With regard to the control packet accumulated first in the dual port RAM 57-1, the processor 59-1 specifies (FIG. 4(*c*)) the format (hereafter referred to as "adaptation format") of the quasi-speech frame which may include the corresponding control information, among the quasi-speech frame indicated in FIGS. 10(*a*) to (*d*), according to the amount of the control information included in the control packet.

Furthermore, the processor 59-1 discriminates whether or not the word length of the speech signals included in the speech packet is a value which can be included in the quasi-speech frame with the above-mentioned adaptation format, by analyzing the contents of the speech packet accumulated in the dual port RAM 57-1 in the order of the time sequence (FIG. 4(*d*)).

If the result of the discrimination is false, the processor 59-1 converts the speech packet accumulated first, among the speech packets accumulated in the dual port RAM 57-1, into a packet having a predetermined format which is receivable by the mobile station 73, and provides the packet to the modulation part 55-1 (FIG. 4(*e*)).

When, however, the result of the above-mentioned discrimination is true, the processor 59-1 generates a packet having the above-mentioned adaptation format by combining the control packet and the speech packet, which are accumulated first in the dual port RAM 57-1 (FIG. 4(*f*)), and provides the packet to the modulation part 55-1 (FIG. 4(*g*)).

Therefore, these packets are converted into transmission signals by primary modulating performed by the modulation part 55-1 and spreading process performed by the radio processing part 78-1, and are sequentially transmitted to the mobile station 73 via the antenna 77-1.

According to the present embodiment, the time at which the word length of the speech signals becomes shorter than a predetermined threshold value is automatically detected based on statistical characteristics of speech signals,and, at that point, these speech signals and the desired control information are transmitted as the quasi-speech frame to the mobile station 73.

Therefore, with regard to the mobile station 73 in which a completed call occurred, channel control can be performed with a high reliability based on the desired procedure without undesired degradation of the speech quality, as long as the delay time in the transmission of the control information is as short as a degree tolerable under statistical characteristics of the above-mentioned speech signals.

Figure 7:
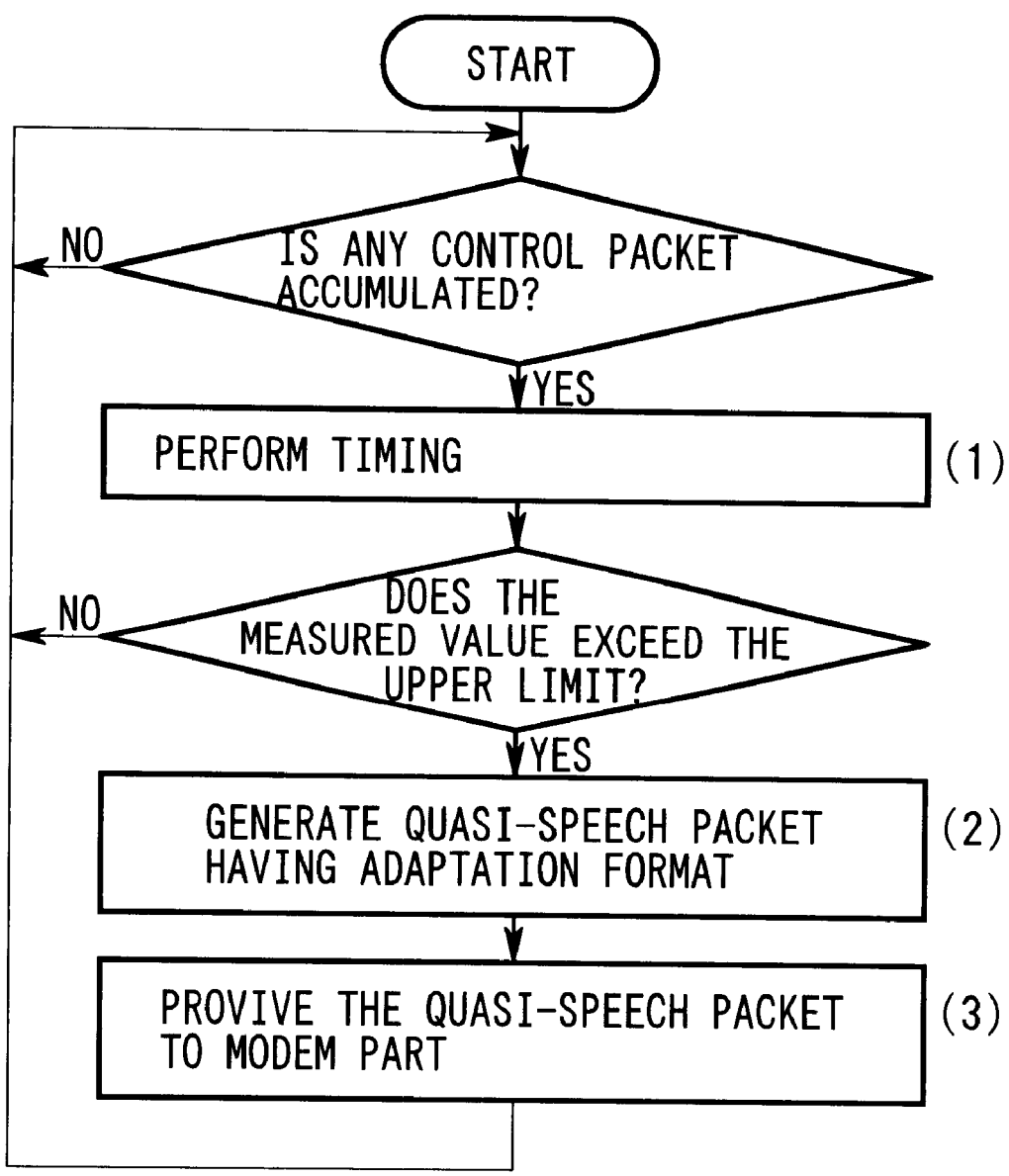
FIG. 7 is a flow chart explaining the operation of the base station in the third embodiment.

FIG. 7 is a flow chart explaining the operation of the base station in the third embodiment.

The operation of the third embodiment will be described in the following with reference to FIGS. 3 to 7.

The difference between the present embodiment and the above-mentioned second embodiment lies in the procedure of the following process performed by the processors 59-1 to 59-m in the modem parts 53-1 to 53-m equipped in the base stations 51-1 to 51-m.

For simplicity, therefore, only the processor 59-1, among the processors 59-1 to 59-m, will be referred to in the following.

In the modem part 53-1 the processor 59-1 times the period during which some kind of control packet is accumulated in the dual port RAM57-1 (FIG. 7(1)).

Furthermore, the processor 59-1 performs the processing based on the same procedure as with the second embodiment during the timed period (simply referred to as "measured value", hereafter) is not longer than the above-mentioned threshold value corresponding to the upper limit of the tolerable delay time (100 msec, for example).

However, when the measured value reaches or exceeds he threshold value, the processor 59-1 generates a quasi-speech frame (FIG. 7(2)) having a format, among the formats shown in FIGS. 10(*a*) to (*d*), including both the control information included in the control packet accumulated in the dual-port RAM57-1 and the speech signals included in the speech packet accumulated first, and provides the quasi-speech frame to the modulation part 55-1 (FIG. 7(3)).

According to the present embodiment mentioned above, service quality as well as speech quality is maintained at a higher level, and channel control can be performed with a higher reliability and efficiency than with the above-mentioned first embodiment, since the control information is transmitted with desired frequency to the mobile station 73 in which a completed call occured, regardless of the types of the conversation-states or the statistical characteristics of the speech signals.

In the present embodiment, although speech signals are transmitted to the mobile station 73 as quasi-speech packets having a format shown in FIG. 10(*a*), the speech signals may be transmitted as any speech signal frame shown in FIGS. 9(*b*) to (*d*).

However, when the above-mentioned speech signal frames do not adapt to the transmission system of the traffic channel assigned to the corresponding completed call on the radio transmission path, or are not necessarily reception-processed by the mobile station 73, speech packets accumulated first in the dual port RAM57-1 may be discarded, for example, and pseudo code words may be added to the corresponding to fields of the quasi-speech frame as long as degradation of speech quality is tolerated.

In each of the above-mentioned embodiments, while the present invention is applied to the base stations 51-1 to 51-m and the base station control station 52 composing a mobile communication system based on the CDMA system, these inventions are applicable to mobile communication systems to which any multiple access systems, channel allocations, zone configurations, and channel controlling systems are applied, and similarly applicable to radio transmission systems providing communication service to terminals included in units other than mobile communication systems, provided that encoding and decoding of the speech signals (not limited to speech signals) are performed by the variable rate codec.

Furthermore, while a variable rate codec of the QCELP method is applied to transmission of speech signals in a radio transmission system in each of the above-mentioned embodiments, any method may be applied to the variable rate codec provided that code words having a variable length can be outputted according to the speech signals, and the desired transmission quality and speech quality can be obtained with reliability within the transmission band.

Besides, in each of the above-mentioned embodiments, although the present invention is applied to mobile communication systems providing voice communication service, the present invention can be similarly applied to any communication system even when, for example, a variable rate codec is applied, and image information together with speech information or image information alone is transmitted via the variable rate codec.

Furthermore, in each of the above-mentioned embodiments, although the STM is applied to the communication links 74-1 to 74-m between the base stations 51-1 to 51-m and the base station control station 52, and to the communication links 76-1 to 76-m between the base station control station 52 and the mobile switching center, any transfer mode, transmission system, or communication system may be applied to these communication links 74-1 to 74-m, 76-1 to 76-m, provided that the desired speech signals and control signals are transmitted with reliability.

Furthermore, in each of the above-mentioned embodiments, the base station control station 52, equipped with the ATM switch 84, is devised to adapt to the ATM switch 84 by the ATM interface parts 88-1 to 88-m, 89-1 to 89-n, and 92 connected to the ports of ATM switch 84, respectively, which adapt with flexibility to the speech signals (packets) having a variable length and to the speech signals and the control information (control packets) having differences in characteristics between, based on the AAL type 2 protocol.

However, any type of switch may be applied in place of the ATM switch 84, provided that the desired response or transmission quality can be achieved without limitations of hardware size or cost, and the desired path can be appropriately formed based on the channel controlling procedure.

Also, any type of protocol may be applied in place of the above-mentioned AAL type protocol, provided that it adapts to the speech signals and the control information which are the transmission information.

Therefore, provided that standardization of the configuration of the base stations 51-1 to 51-m, the base station control station 52, and the communication links 74-1 to 74-m and 76-1 to 76-n can be achieved in conformance with the desired mobile switching center, for example, in addition to the E1 terminating parts 81-1 to 81-m equipped in the base stations 51-1 to 51-m, the E1 terminating parts 86-1 to 86-m, and the speech codec 91 equipped in the base station 52, the assembly/disassembly parts 87-1 to 87-m and the signaling terminating part 93 may be adapted to the AAL type2 protocol.

Although no signaling system or transmission path to be applied to the signaling terminating part 85 and the mobile switching center for transmitting to or receiving from each other the desired signaling signals is disclosed in any of the above-mentioned embodiments, such signaling signals may be transmitted or received via the time slot 16 pre-assigned for transferring the signaling information, for example, among the channels formed based on the STM system in the communication links 76-1 to 76-n, or transmission paths with any other type of signaling systems.

Besides, the present invention is not limited to the above-mentioned embodiments, and may be realized in a variety of manners, allowing any modification to be made to a portion or all of the composing elements.

What is claimed is:

1. A base station equipment for performing delivery, between a radio station mounted with a variable rate codec and located in a wireless zone formed by said base station equipment and a base station control station which performs channel control of a call that occurred in said radio station, of control information and speech signals to be transmitted or received, said base station equipment comprising:

speech signal monitoring means for extracting specific speech signals to which control information of said channel control is added, among the speech signals generated by said variable rate codec and received from said radio station; and disassembly processing means for disassembling the speech signals and control information included in said specific speech signals into individual transmission units which are to be transmitted to said base station control station and include identification information of any one of said radio station, a completed call occured in said radio station, or a channel assigned to said completed call under said channel control.

2. A base station equipment for performing delivery, between a radio station mounted with a variable rate codec and located in a wireless zone formed by said base station equipment and a base station control station which performs channel control of a call occured in said radio station, of control information and speech signals to be transmitted or received, said base station equipment comprising:

control information accumulation means for accumulating control information which is received from said base station control station and includes identification information of any one of a radio station to be the destination among said radio stations, a completed call that occurred in the radio station, or a channel assigned to said completed call under said channel control;

rate discrimination means for discriminating whether or not the encoding rate applied at said radio station is lower than the value showing that the control information, accumulated by said control information accumulation means and including the identification information common to said speech signals, is packable to said speech signals in the generation of said speech signals, which are received from said base station control station and include said any of identification information; and assembly means for generating specific speech signals to be transmitted to said wireless zone, by adding the control information including common identification information, among the control information accumulated by said control information accumulating means, to said speech signals providing the result of the discrimination when the result of the discrimination performed by said rate discrimination means is true.

3. A base station equipment comprising:

control station interface means for transmitting to or receiving from a base station control station which performs channel control, control information related to the channel control of calls that occurred in a radio station mounted with a variable rate codec and located in a wireless zone formed by said base station equipment, and speech signals of completed calls that occurred under the channel control;

radio interface means for forming said wireless zone and performing transmission/reception and relay, between said radio stations and said control station interface means, of control information and speech signals to be transmitted to or received from said base station control station via said control station interface means;

speech signal monitoring means for extracting specific speech signals that has control information related to said channel control included in speech signals received by said radio interface means and generated by the variable rate codec mounted in said radio station as the transmitting end among said radio stations; and disassembly processing means for disassembling speech signals and control information included in said specific speech signals extracted by said speech signal monitoring means into individual transmission units including identification information of any one of said radio station as the transmitting end, the completed call existing in said radio station, or the channel assigned to said completed call under said channel control;

wherein said control station interface means transmits said individual transmission units obtained by said disassembly processing means to said base station control station.

4. A base station equipment comprising:

control station interface means for transmitting to or receiving from a base station control station which performs channel control, control information related to the channel control of calls generated in a radio station mounted with a variable rate codec and located in a wireless zone formed by said base station equipment, and speech signals of completed calls that occured under the channel control;

radio interface means for forming said wireless zone and performing transmission/reception and relay, between said radio stations and said control station interface means, of control information and speech signals to be transmitted to or received from said base station control station via the said control station interface means;

control information accumulation means for accumulating control information which is received from said base station control station by said control station interface means and includes identification information of any one from the radio station to be the destination among said radio stations, the completed calls occured in the radio station, or the channel assigned to said completed calls under said channel control;

rate discrimination means for discriminating whether or not the encoding rate applied is lower than the value showing that the control information, accumulated by said control information accumulation means and including the identification information common to said speech signals, is packable to said speech signals in the generation of the speech signals which are received from said base station control station by said control station interface means and include said any of identification information; and assembly means for generating, when the result of the discrimination performed by said rate discrimination means is true, specific speech signals by adding control information, including common identification information among the control information accumulated in said control information accumulating means, to the speech signals which are received by said control station interface means and provide said result of the discrimination;

wherein said radio interface means transmits said specific speech signals to said wireless zone.

5. A base station equipment according to claim 4, further comprises:

monitoring means for monitoring a period during which control information including the same identification information as the identification information included in individual speech signals which are as false according to the result of said discrimination is being accumulated in said control information accumulation means, and for specifying a time point when the length of said period exceeds a predetermined upper limit; and signaling priority means for transmitting all or a portion of the control information including the identification information corresponding to said specified time point, among the identification information which has been accumulated in said control information accumulation means, to said wireless zone via said radio interface means at the time point.

6. A base station equipment according to claim 5, wherein said assembly means further comprises means for discarding the speech signals to be built in said specific speech signals when said monitoring means specifies any time point.

7. A base station equipment according to claim 3, wherein said control information and said speech signals are delivered as packets adapted to the ATM ATM adaptation layer protocol in segments except for the radio transmission segment between said radio interface means and the radio stations, and said transmission segment between said control station interface means and said base station control station.

8. A base station equipment according to claim 4, wherein said control information and said speech signals are delivered as packets adapted to the ATM ATM adaptation layer protocol in segments except for the radio transmission segment between said radio interface means and the radio stations, and said transmission segment between said control station interface means and said base station control station.

9. A base station equipment according to claim 7, wherein a path of the ATM layer which is a lower layer of the ATM adaptation layer is formed between said control station interface means and said base station control station, and said control station interface means interfaces between said ATM adaptation layer and said ATM layer.

10. A base station equipment according to claim 8, wherein a path of the ATM layer which is a lower layer of the ATM adaptation layer is formed between said control station interface means and said base station control station, and said control station interface means interfaces between said ATM adaptation layer and said ATM layer.

11. A base station control equipment comprising:

exchange interface means for interfacing with a switching center with regard to transmission and reception of speech signals, said speech signals being a series of datagrams;

channel control means for performing channel control of the wireless zone formed by a base station equipment, and for outputting or accepting, control information including the identification information of any one of the radio station located in said wireless zone wherein a call occurred, said call, or the channel assigned to said call under said channel control based on a predetermined procedure, said control information being a series of datagrams;

base station interface means for interfacing with said base station equipment with regard to transmission and reception of said control information and said speech signals; and exchange means for performing delivery of the control information received via said base station interface means and the control information outputted by said channel control means, said delivery being done per datagram between said channel controls means and said base station interface means, and for performing delivery of the speech signals received via said base station interface means and said exchange interface means, said delivery being done per datagram between said exchange interface means and said base station interface means.

12. A base station control equipment according to claim 11, wherein packets adapted to said ATM ATM adaptation layer protocol in segments with said control information and said speech signals are delivered as ATM cells except for the transmission segments between said base station interface means and said base station equipment, and between said exchange interface means and said switching center.

* * * * *